Patented Jan. 22, 1935

1,988,663

UNITED STATES PATENT OFFICE 1,988,663

GALENA BLUE MIRROR AND METHOD OF PRODUCING GALENA BLUE FILM

William Peacock, Jr., Philadelphia, Pa., assignor to Peacock Laboratories, Inc., Philadelphia, Pa., a corporation of Pennsylvania No Drawing. Application November 21, 1930, Serial No. 497,341. Renewed May 24, 1934

6 Claims. (Cl. 91—68)

This invention relates to the manufacture of mirrors and the like and more particularly to an improved method of depositing galena (lead sulphide) upon the surface to be treated whereby to obtain a darkened reflecting medium.

It is among the objects of the present invention to provide an improved method of manufacturing mirrors having darkened reflecting surfaces for use in those instances where a non-glaring reflection is desired to be had.

A further object of the invention is to provide an improved process which permits the formation of a much more complete and stable oxide of lead for precipitation on the surface to be coated than has been possible heretofore and prior to this invention.

A still further object of the invention is the provision of an improved process for depositing lead sulphide upon a glass surface or the like wherein the deposition of the metal is somewhat slowed up in its action whereby there is obtained a more homogeneous coating of the deposited metal.

A still further object of the invention is to deposit lead sulphide upon a glass surface or the like in such manner as to render the deposited metal free from the presence of suboxides and to eliminate the presence of streaks, casts and other such discolorations in the completed article.

Still another and important object of the present invention is to provide a method of depositing lead sulphide in the form of a thin film or coating upon glass or the like in a manner which is less hazardous and commercially more practicable than any of the present known methods.

Other objects of the invention and advantages resulting from the practice thereof will appear more fully hereinafter.

In carrying out the invention, three primary solutions are first prepared as follows:—

Solution No. 1

| | Ounces |
|---|---|
| Lead nitrate | 2 |
| Distilled water | 32 |

Solution No. 2

| | Ounces |
|---|---|
| Potassium hydroxide, sodium hydroxide or other similar alkali agent | 4 |
| Distilled water | 32 |

Solution No. 3

| | Ounces |
|---|---|
| Thiourea (thiocarbamide) | 2 |
| Distilled water | 48 |

In preparing the above solutions care must be taken to insure complete dissolution of the chemicals and each solution should be shaken well before using. In order to produce a lead sulphide film or layer upon the glass or other surface to be treated either of two processes may be employed, one being designated as the "hot" process and the other as the "cold" process.

In either process, the glass or other surface to be coated is initially block polished or hand rubbed with rouge, after which it is well brushed with water. Following this water brushing operation, a weak solution of tin chloride is applied to the surface to be treated preferably by means of a felt block or bristle brush. The surface is then rinsed well with water and lightly brushed.

The glass so treated is then placed in a horizontal plane and accurately leveled with wedges, the surface to be coated being uppermost. In the "hot" process, after the glass has been initially treated, washed and leveled as just described, the following Solution No. 4 is poured upon the surface to be coated:—

Solution No. 4

| | Ounces |
|---|---|
| Distilled water | 4 |
| Solution No. 1 | 1 |
| Solution No. 2 | 1 |
| Solution No. 3 | 1 |

Attention is here directed to the fact that in preparing Solution No. 4, the numbered solutions are added to the distilled water in the order given above and that Solution No. 3 is not added until just before the final solution is to be poured upon the glass. Following the application of the tin chloride solution the surface to be treated must be kept wet until the final solution has been applied thereto. As much of the final Solution No. 4 is poured upon the leveled surface as the latter will hold without the solution running over the edges. Heat is uniformly applied to the glass preferably by placing the glass upon a table or bed the surface of which is heated to the required temperature.

In a relatively short time (about 15 minutes) lead sulphide will have deposited out of the final solution and upon the glass. The excess solution is then removed from the glass surface, preferably with a piece of chamois, after which the deposited film is well wiped to obtain a clean metallic surface. A second application of the final Solution No. 4 is then made. In about 10 minutes a second coating or film of lead sulphide will have deposited out of solution upon the first coating, the second coating being also wiped and dried with the chamois. When the deposited film of metal shows no dark spots indicating the presence of moisture, a coating of shellac is applied followed by a coating of paint, if desired.

Lead sulphide or galena is a strong metal and adheres tenaciously to the glass. If the mirror shows a grayish color it is usually due to an insufficiently heavy coating of the deposited metal. An additional coating will remove this defect.

In carrying out the "cold" process, the application of heat is of course omitted and in preparing the final solution no additional distilled water is employed. In other words, the final solution for use in the "cold" process is prepared as follows:—

|  | Ounces |
|---|---|
| Solution No. 1 | 1 |
| Solution No. 2 | 1 |
| Solution No. 3 | 1 |

This final "cold" solution is prepared by adding one part of Solution No. 2 to one part of Solution No. 1. These are thoroughly mixed and allowed to stand for about 15 minutes, after which one part of Solution 3 is added. After Solution No. 3 has been added, it is necessary to immediately pour the final solution upon the glass due to the fact that the metal tends to deposit out of solution quite rapidly.

Both the hot and cold processes as hereinbefore described have been found quite effective in the application of a firm and homogeneous film or coating of metallic lead sulphide upon a glass surface or the like, it being of course understood that this lead sulphide is formed by the combination of the sulphur present in Solution No. 3 with the lead present in Solution No. 1. It will be understood that in both the hot and cold processes the thickness of the deposited film or coating may be reduced as desired by introducing additional quantities of distilled water either to the final solution or to the primary solutions.

It is important to note that while galena blue (lead sulphide) will not work or combine with silver it will combine with gold. The method of producing a two-tone mirror consisting of galena and gold is described in my copending application, Serial No. 397,340, filed Nov. 21, 1930, and it is not believed necessary to describe this method in detail herein. It will be understood of course that various changes may be made from time to time without departing from the essential spirit or general principles of the present invention and it is accordingly intended to claim the same broadly as well as specifically as indicated by the appended claims.

What is claimed as new and useful is:—

1. The method of producing a lead sulphide film upon a glass body or the like which consists in preparing an aqueous solution of lead nitrate, in preparing an aqueous solution of sodium or potassium hydroxide or the like, in preparing an aqueous solution of thio urea, and in adding said aqueous solutions to a quantity of water in the order named.

2. The method of producing a lead sulphide film upon a glass body or the like which consists in preparing a solution of one part lead nitrate to approximately sixteen parts of water by weight, in preparing a second solution of one part of potassium or sodium hydroxide or the like to approximately eight parts of water by weight, in preparing a third solution of one part of thio urea to approximately twenty-four parts of water by weight, and in finally adding equal parts of said first, second and third solutions to four parts of water by weight, the final solution so prepared being poured upon the surface to be treated.

3. The method of producing a lead sulphide film upon a glass body or the like which consists in preparing an aqueous solution of lead nitrate, in preparing a second aqueous solution of an alkali agent, in preparing a third aqueous solution of thio urea, preparing a final solution containing equal parts of said aqueous solutions, and in pouring said final solution upon the surface to be treated.

4. The method of producing a lead sulphide film upon a glass body or the like which consists in separately preparing aqueous solutions of lead nitrate, an alkaline hydroxide and thio urea, in preparing a final solution containing equal parts of said aqueous solutions, in applying a solution of tin chloride to the surface to be treated, and in finally pouring upon the tin chlorided surface the said final solution.

5. The method of producing a final solution from which lead sulphide may be deposited upon a glass surface which initially consists in separately preparing, first, a solution of one part of lead nitrate to approximately sixteen parts of water, secondly, a solution of one part of an alkaline hydroxide to approximately eight parts of water, and thirdly, a solution of one part of thio urea to approximately twenty-four parts of water, and in preparing said final solution by mixing together equal parts of said aqueous solutions, the second and third solutions being added to the first solution in the order named herein.

6. A method of depositing upon a glass body or the like a lead sulphide film which consists in brushing the surface of the body to be treated with water, in applying a solution of tin chloride thereto, in pouring upon the wet chlorided surface a film-forming liquid containing aqueous solutions of lead nitrate, an alkali agent and thio urea, and in removing the excess or undeposited liquid from the surface so treated leaving upon said surface the lead sulphide deposited out of said liquid.

WILLIAM PEACOCK, Jr.